US006987885B2

(12) United States Patent  
Gonzalez-Banos et al.

(10) Patent No.: US 6,987,885 B2  
(45) Date of Patent: Jan. 17, 2006

(54) SYSTEMS AND METHODS FOR USING VISUAL HULLS TO DETERMINE THE NUMBER OF PEOPLE IN A CROWD

(75) Inventors: Hector H. Gonzalez-Banos, Mountain View, CA (US); Danny B. Yang, Cincinnati, OH (US); Leonidas J. Guibas, Palo Alto, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/868,639

(22) Filed: Jun. 14, 2004

(65) Prior Publication Data

US 2005/0025341 A1  Feb. 3, 2005

Related U.S. Application Data

(60) Provisional application No. 60/478,213, filed on Jun. 12, 2003, provisional application No. 60/478,218, filed on Jun. 12, 2003.

(51) Int. Cl.  
*G06K 9/00* (2006.01)

(52) U.S. Cl. .................. 382/192; 382/103; 382/104

(58) Field of Classification Search ........ 382/103–104, 382/141, 192, 115, 154, 173–180, 190; 340/573.1; 348/169  
See application file for complete search history.

(56) References Cited

U.S. PATENT DOCUMENTS

| 5,298,697 A * | 3/1994 | Suzuki et al. ............... 187/392 |
| 5,465,115 A * | 11/1995 | Conrad et al. .............. 348/155 |
| 5,550,928 A * | 8/1996 | Lu et al. ..................... 382/116 |
| 5,866,887 A | 2/1999 | Hashimoto et al. |
| 6,633,232 B2 * | 10/2003 | Trajkovic et al. ....... 340/573.1 |
| 6,697,104 B1 | 2/2004 | Yakobi et al. |

OTHER PUBLICATIONS

Regazzoni, "A Real-Time Vision System for Crowding Monitoring", IEEE 0-7803-0891-3, Mar. 1993, pp. 1860-1864.*

Lin, "Estimation of Number of People in Crowded Scenes Using Perspective Transformation", IEEE Transactions on Systems, Man, and Cybernetics-Part A: Systems and Humans, vol. 31, No. 6, Nov. 2001, pp. 645-654.*

Marana, "Estimation Crowd Density With Minkowski Fractal Dimension", IEEE, 0-7803-5041-3, 1999, pp. 3521-3524.*

Laurentini et al., "Introducing a New Problem: Shape-from-Silhouette When the Relative Positions of the Viewpoints is Unknown", IEEE Transaction on Pattern Analysis and Machine Intelligence, vol. 25, No. 11, Nov. 2003, pp. 1484-1493.

(Continued)

*Primary Examiner*—Jose L. Couso  
*Assistant Examiner*—Tom Y. Lu  
(74) *Attorney, Agent, or Firm*—Fenwick & West LLP; Mark E. Duell

(57) ABSTRACT

Systems, apparatuses, and methods are presented that determine the number of people in a crowd using visual hull information. In one embodiment, an image sensor generates a conventional image of a crowd. A silhouette image is then determined based on the conventional image. The intersection of the silhouette image cone and a working volume is determined. The projection of the intersection onto a plane is determined. Planar projections from several image sensors are aggregated by intersecting them, forming a subdivision pattern. Polygons that are actually empty are identified and removed. Upper and lower bounds of the number of people in each polygon are determined and stored in a tree data structure. This tree is updated as time passes and new information is received from image sensors. The number of people in the crowd is equal to the lower bound of the root node of the tree.

42 Claims, 12 Drawing Sheets

OTHER PUBLICATIONS

International Search Report, PCT/US04/18842, Feb. 3, 2005.

Glassner, A., *Graphics Gems*, 1998, pp. 75-97, Morgan Kaufmann, USA.

Goodman, J. et al., *Handbook of Discrete and Computational Geometry*, 1997, pp. 599-630, CRC Press, USA.

Horprasert, T. et al., *A Robust Background Subtraction and Shadow Detection*, Proceedings of Asian Conference on Computer Vision, Jan. 2000.

Laurentini, A., *The Visual Hull Concept for Silhouette-Based Image Understanding*, IEEE Transactions on Pattern Analysis and Machine Intelligence, Feb. 1994, pp. 150-162, vol. 16, No. 2.

Yang, D. et al., *Counting People in Crowds with a Real-Time Network of Simple Image Sensors*, Proceedings of the Ninth IEEE International Conference on Computer Vision (ICCV), 2003, pp. 122-129.

Q. Cai, J.K. Aggarwal, "Automatic Tracking of Human Motion in Indoor Scenes Across Multiple Synchronized Video Streams," in *ICCV*, 1998, pp. 356-362.

Xing Chen, "Design of Many Camera Tracking Systems for Scalability and Efficient Resource Allocation," Ph.D. dissertation, Stanford University, Jun. 2002.

G. Cheung, T. Kanade, J. Boughet, M. Holler, "A Real Time System for Robust 3D Voxel Reconstruction of Human Motions," in *CVPR*, v.2,2000, pp. 714-720.

R. Collins, A. Lipton, T. Kanade, "A System for Video Surveillance and Monitoring," *American Nuclear Soc. 8th Int. Topical Meeting on Robotics and Remote Systems*, 1999.

T. Darrell, G. Gordon, M. Harville, J. Woodfill, "Integrated person tracking using stereo, color, and pattern detection," in *CVPR*, 1998, pp. 601-609.

L. Doherty, B.A. Warneke, B.E. Boser, K. Pister, "Energy and Performance Considerations for Smart Dust," *Int. J. of Parallel Distributed Systems*, vol. 4, No. 3, 2001, pp. 121-133.

H.H. Gonzalez-Banos and J.C. Latombe, "A Randomized Art-Gallery Algorithm for Sensor Placement," *Proc. 17th ACM Symp. on Computational Geometry* (SoCG'01), 2001, pp. 232-240.

I. Haritaoglu, D. Harwood, L.S. Davis, "$W^4S$: A Real-Time System for Detecting and Tracking People in 2 1/2 D," in *European Conference on Computer Vision*, 1998.

I. Haritaoglu, D. Harwood, L.S. Davis, "Hydra: Multiple People Detection and Tracking Using Silhouettes," *Int. Conf on Image Analysis and Processing*, 1999.

J. Hill, R. Szewczyk, A. Woo, S. Hollar, D. Culler, K. Pister, "System Architecture Directions for Networked Sensors," *ASPLOS*, 2000.

T. Huang, S. Russell, "Object identification: a Bayesian analysis with application to traffic surveillance," *Artificial Intelligence*, 1998, 103:1-21.

C. Intanagonwiwat, R. Govindan, D. Estrin, "Directed diffusion: a scalable and robust communication paradigm for sensor networks," *MobiCom*, 2000.

S. Intille, J.W. Davis, A. Bobick, "Real-Time Closed-World Tracking," in *CVPR*, 1997, pp. 697-703.

M. Israd, J. MacCormick, "BraMBLe: A Bayesian Multiple-Blob Tracker," in *ICCV*, v. 2, 2001, pp. 34-41.

V. Kettnaker, R. Zabih, "Counting People from Multiple Cameras," *ICMCS*, 1999, pp. 267-271.

J. Krumm, S. Harris, B. Meyers, B. Brumitt, Hale, S. Shafer, "Multi-camera Multi-person Tracking for EasyLiving," *IEEE Inter. Workshop on Visual Surveillance*, 2000.

S.H. Lim, A. El Gamal, "Integration of Image Capture and Processing—Beyond Single Chip Digital Camera," *Proc. of SPIE, Sensors and Camera Systems for Scientific, Industrial, and Digital Photography Applications II*, 2001, pp. 219-226.

W. Matusik, C. Buehler, L. McMillan, "Polyhedral Visual Hulls for Real-Time Rendering," *Eurographics Workshop on Rendering*, 2001.

W.M. Merrill, K. Sohrabi, L. Girod, J. Elson, F. Newberg, W. Kaiser, "Open Standard Development Platforms for Distributed Sensor Networks," *Proc. of SPIE, Unattended Ground Sensor Technologies and Applications IV*, 2002.

A. Mittal, L.S. Davis, "M2Tracker: A Multi-View Approach to Segmenting and Tracking People in a Cluttered Scene Using Region-Based Stereo," in *ECCV*, 2002.

J. Orwell, P. Remagnino, G.A. Jones, "Multi-Camera Colour Tracking," *IEEE Workshop on Visual Surveillance*, 1999.

G.J. Pottie, W.J. Kaiser, "Wireless integrated network sensors," *CACM*, vol. 43, No. 5, 2000, pp. 51-58.

T. Sogo, H. Ishiguro, M. Trivedi, "Real-Time Target Localization and Tracking by N-Ocular Stereo," *IEEE Workshop on Omnidirectional Vision*, 2000.

R. Szeliski, "Rapid Octree Construction from Image Sequencies," *CVGIP: Image Understanding*, vol. 58, No. 1, 1993, pp. 23-32.

T. Wada, X. Wu, S. Tokai, T. Matsuyama, "Homography Based Parallel Volume Intersection: Toward Real-Time Volume Reconstruction using Active Cameras," *IEEE Workshop on Comp. Arch. for Machine Perception*, 2000, pp. 331-340.

T. Zhao, R. Nevatia, "Stochastic Human Segmentation from a Static Camera," *IEEE Workshop on Motion and Video Computing*, 2002.

* cited by examiner

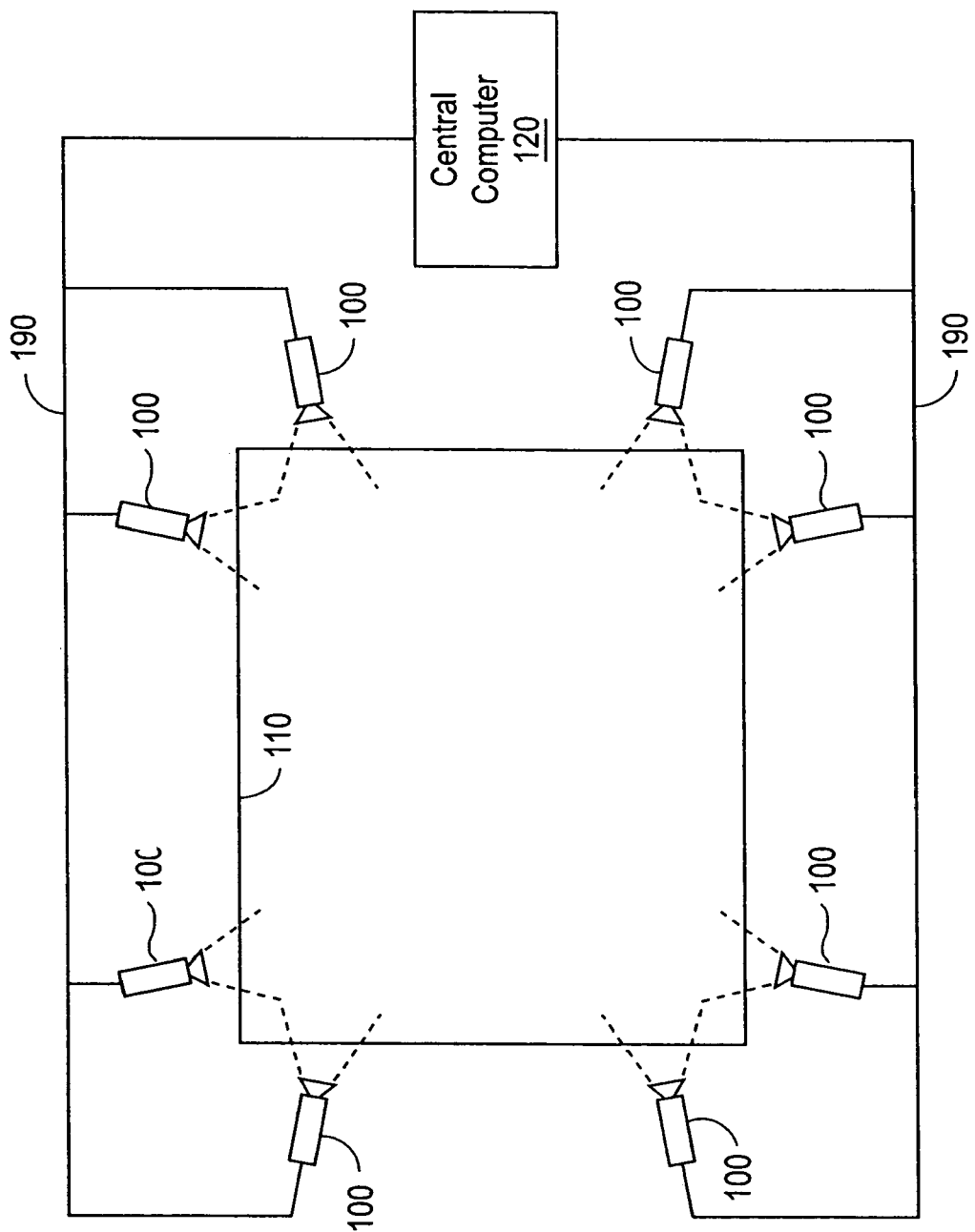

SYSTEMS AND METHODS FOR USING VISUAL HULLS TO DETERMINE THE NUMBER OF PEOPLE IN A CROWD

CROSS-REFERENCE TO RELATED APPLICATION

This application claims priority from the following U.S. provisional patent applications, which are hereby incorporated by reference: Ser. No. 60/478,213, filed on Jun. 12, 2003, entitled "Counting People in Crowds with a Real-Time Network of Simple Image Sensors" and Ser. No. 60/478,218, filed on Jun. 12, 2003, entitled "Counting and Tracking People in Real-Time Using a Network of Simple Image Sensors".

BACKGROUND OF THE INVENTION

1. Field of the Invention

The present invention relates to using computing devices to determine the number of people in a crowd. More particularly, the present invention relates to using visual hull information in order to determine the number of people in a crowd.

2. Description of Background Art

Several techniques exist for determining the number of people in a crowd. However, each of these techniques has its drawbacks. One technique is to generate an aerial image of a crowd and then count the number of people in the image. For example, a crowd at an outdoor venue can be photographed from an airplane or satellite. This image can then be used to count the number of people in the crowd. One disadvantage of this technique is that in order to obtain such an image, the crowd must be outdoors. Another disadvantage is that the image is often of poor resolution, making it difficult to count the number of people. Yet another disadvantage is that this technique provides the number of people in a crowd at a specific point in time (i.e., when the image was produced). In order to determine, at a later time, the number of people in the crowd, the entire process must be duplicated. This is because there is no way to use information obtained in the first iteration during the second iteration.

Another technique, which takes into account the dynamic nature of a crowd, is to designate physical checkpoints within and/or around the crowd. The number of people in the crowd is then estimated based on the number of people that pass by the checkpoints. The number of checkpoints required depends on the size of the crowd, and several checkpoints are often necessary. One way to determine the number of people at a checkpoint is manually (i.e., a person actually counts the people). This technique is very labor-intensive. Another, less labor-intensive, way is to use devices to count people. For example, a camera can "watch" a crowd at a checkpoint and a computer can process the resulting image. Both of these techniques are error-prone when checkpoints are busy, however, because people tend to occlude each other, making it difficult to determine how many people are present.

Another problem with the checkpoint technique is that of double counting. It's possible for a person to be visible from multiple checkpoints. This may occur because the person has moved between the checkpoints or because the viewing areas of the checkpoints overlap. The first situation can be addressed by determining, roughly simultaneously, how many people are at each checkpoint. The degree of simultaneity necessary depends on the mobility of people in the crowd and the distance between checkpoints. The second situation, however, still remains. An alternative approach is to identify (track) specific individuals and then ensure that each individual is counted only once. Tracking individuals is difficult when imaging devices are used to count people at a checkpoint. First, individuals can look very similar. Additionally, information from several different devices must be aggregated and processed, which requires a lot of bandwidth and computation.

What is needed is a way to determine the number of people in a crowd in real time using a limited amount of bandwidth and a limited amount of computation, regardless of the size and density of the crowd.

SUMMARY OF THE INVENTION

Systems, apparatuses, and methods are presented that determine the number of people in a crowd using visual hull information. In one embodiment, a system comprises a network of image sensors and a central computer. In another embodiment, a system further comprises one or more local computers. In one embodiment, an image sensor may be placed at any height and at any angle relative to the crowd.

In one embodiment, the planar projection of the visual hull of the crowd is determined as follows: An image sensor generates a conventional image of the crowd as seen from that sensor. A silhouette image is then determined based on the conventional image. The intersection of the silhouette image cone and the working volume is determined. The projection of the intersection onto a plane is determined. Finally, planar projections from several image sensors are aggregated.

In one embodiment, the central computer aggregates planar projections from several image sensors by intersecting them, forming a subdivision pattern. In one embodiment, the central computer requires strict consensus when determining that a polygon contains an object. In another embodiment, the central computer uses a voting scheme. In one embodiment, the central computer then determines which polygons are actually empty and removes them.

In one embodiment, the central computer then determines upper and lower bounds of the number of people in each polygon. In one embodiment, these bounds are stored in a tree data structure. In one embodiment, this tree is updated as time passes and new information is received from image sensors. In one embodiment, the number of people in the crowd is equal to the lower bound of the root node of the tree.

BRIEF DESCRIPTION OF THE DRAWINGS

The invention is illustrated by way of example, and not by way of limitation, in the figures of the accompanying drawings in which like reference numerals refer to similar elements.

FIG. 1 illustrates an aerial view of a system (in block-diagram form) for determining the number of people in a crowd, according to one embodiment of the invention.

DETAILED DESCRIPTION OF THE EMBODIMENTS

Figure 2B:
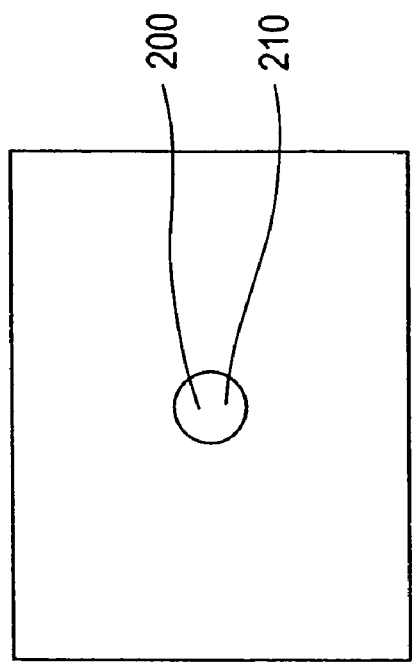
FIG. 2B illustrates a top view of the person and the projected silhouette cone in FIG. 2A.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

1. Architecture of System for Determining the Number of People in a Crowd

Although the following description addresses a system for determining the number of people in a crowd, the system can be used to determine the number of objects in a particular area. The objects can be of the same type (e.g., people), or they can be of different types (e.g., people and animals).

FIG. 1 illustrates an aerial view of a system (in block-diagram form) for determining the number of people in a crowd, according to one embodiment of the invention. Several image sensors 100 surround a rectangular area 110 where a crowd of people would be present. Area 110 may or may not be delimited by a physical boundary. Although eight image sensors 100 are shown in the illustrated embodiment, any number of image sensors 100 larger than one may be used. In general, as the number of image sensors 100 used increases, the size of area 110 that the system is able to handle also increases.

In one embodiment, the system illustrated in FIG. 1 computes a lower bound and an upper bound on the number of people present in area 110. In another embodiment, the lower bound is equal to the actual number of people present. In general, as the number of sensors 100 used increases, the number of people that the system is able to correctly count also increases. In yet another embodiment, the system always computes a lower bound and an upper bound on the number of people present in area 110.

In one embodiment, the image sensors 100 are connected to a central computer 120 using a network 190. The communication links to and from the network 190 can be wireline or wireless (e.g., terrestrial- or satellite-based transceivers). In one embodiment, the network 190 is a private network. In another embodiment, the network 190 is an IP-based Local Area Network (LAN) or Wide Area Network (WAN).

Data is sent from the image sensors 100 to the central computer 120. The central computer 120 then uses this data to determine a planar projection of the visual hull of the crowd. A visual hull of an object is the largest volume in which the object can reside that produces the same silhouette as the object itself for all views outside the object. In other words, the visual hull is the intersection of several silhouette cones of the object. The silhouette cones represent different views of the object as seen from different locations. Techniques for generating visual hulls include volume intersection and shape-from-silhouette. The visual hull of an object is guaranteed, by definition, to fully enclose the object. Visual hulls and methods of generating them are known to those of ordinary skill in the art and are further described in "The Visual Hull Concept for Silhouette-Based Image Understanding" by A. Laurentini, IEEE Transactions on Pattern Analysis and Machine Intelligence, 16:2, February 1994, which is hereby incorporated by reference. A planar projection of a visual hull is the projection of a visual hull onto a plane. In one embodiment, the central computer 120 determines the projection of the crowd's visual hull onto the floor of the rectangular area 110. In this embodiment, the planar projection of the crowd's visual hull is similar to the silhouette of the crowd as seen from a location above the crowd.

Once the planar projection of the visual hull of the crowd has been determined, the central computer 120 determines the number of people in the crowd. The method that the central computer 120 uses to determine the number of people in the crowd will be explained below with reference to FIG. 8.

As mentioned above, the central computer 120 uses data from the image sensors 100 to determine a planar projection of the visual hull of the crowd. In one embodiment, an image sensor 100 sends data to the central computer 120 after it has received a query from the central computer 120. In another embodiment, an image sensor 100 sends data to the central computer 120 without having received a query. In yet another embodiment, an image sensor 100 sends data to the central computer 120 periodically. If two sensors 100 send data to the central computer 120 periodically, their transmissions may or may not be synchronized.

a. Using System to Determine a Planar Projection of the Visual Hull of a Crowd

In one embodiment, the planar projection of the visual hull of a crowd is determined by determining the visual hull of the crowd (based on views of the crowd from different sensors) and then projecting the visual hull onto a plane. In another embodiment, which requires fewer computing resources, the planar projection of the visual hull of a crowd is determined by projecting each silhouette cone onto a plane and then aggregating the resulting two-dimensional maps. While this embodiment produces only an approximation of the planar projection of the visual hull, the approximation is close enough to determine the number of people in a crowd. In yet another embodiment, the amount of computing resources required by the above-referenced embodiments is further reduced by intersecting the visual hull of the crowd with a working volume (the former embodiment) or by intersecting each silhouette cone with a working volume (the latter embodiment).

Figure 11:
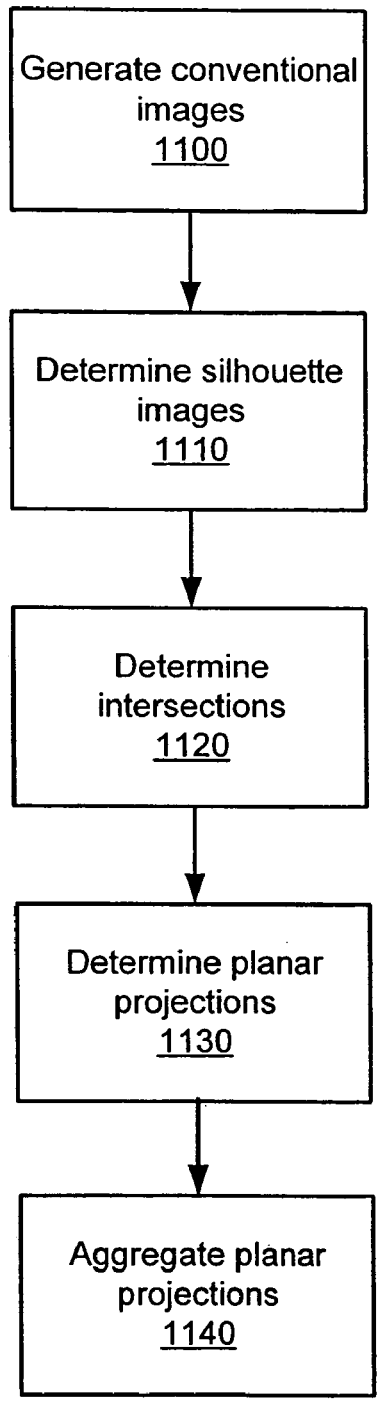
FIG. 11 illustrates a method for using conventional images of a crowd to determine a planar projection of the visual hull of the crowd, according to one embodiment of the invention.

FIG. 11 illustrates a method for using conventional images of a crowd to determine a planar projection of the visual hull of the crowd, according to one embodiment of the invention. In the first step, a plurality of conventional images of the crowd are generated 1100. A plurality of silhouette images are then determined 1110 based on the conventional images. Then, the intersection of each silhouette image cone and the working volume is determined 1120. The projection of each intersection onto a plane is then determined 1130. Finally, the projections are aggregated 1140 to form a planar projection of the visual hull of the crowd.

Steps 1100, 1110, 1120, 1130, and 1140 may be performed by, for example, image sensors 100, central computer 120, or additional local computers (not shown). In one embodiment, the communication architecture between the image sensors 100 is less centralized. In one embodiment, one or more local computers is used to process data from one or more nearby sensors 100. This local computer then sends the resulting data to a central computer 120 for further processing.

In one embodiment, for example, an image sensor 100 generates 1100 a conventional image of the crowd as seen from the view of that sensor 100. In this embodiment, an image sensor 100 comprises any type of device, such as a camera, that can produce a conventional image.

A silhouette image can then be determined 1110 based on this conventional image. In one embodiment, the silhouette image uses only two colors: one for the foreground (people in the crowd) and one for the background (places where no people are present). In another embodiment, a silhouette image is a black-and-white bitmap.

Any of several methods can be used to determine 1110 the silhouette image. In one embodiment, the silhouette image is determined 1110 using background subtraction. The background is removed from the conventional image to produce a silhouette image. In one embodiment, the output of an image sensor 100 is calibrated against an image of the background as seen from the same sensor 100 when no people are present. In one embodiment, a computer performs background subtraction. In another embodiment, a collection of CMOS sensors performs background subtraction. For example, embedded CMOS logic compares the values of pixels in the conventional image based on the values of nearby pixels in the same or a previous image. Background subtraction is known to those of ordinary skill in the art and is further described in "A Robust Background Subtraction and Shadow Detection" by T. Horprasert et al., Proceedings of Asian Conference on Computer Vision, January 2000.

In another embodiment, the silhouette image is determined 1110 using motion detection. In this embodiment, moving objects are detected in the conventional image and extracted as silhouettes. Stationary objects are considered to be part of the background and are not included in the silhouette image. Motion detection can be performed using, for example, a computer or a collection of CMOS sensors. Embedded CMOS logic would perform motion detection by comparing the value of pixels in an image with the values of nearby pixels in the same or a previous image. Motion detection techniques are known to those of ordinary skill in the art.

In yet another embodiment, the silhouette image is determined 1110 using information about distances of objects in the image. In this embodiment, foreground objects are those in close proximity to the sensor 100, while background objects are those far away from the sensor 100. A silhouette image is produced by comparing object distances to a threshold value and discriminating foreground objects from the background. Three-dimensional depth sensors are known to those of ordinary skill in the art and are available from, for example, Canesta, Inc. and 3DV Systems, Ltd.

Step 1110 can be performed by, for example, an image sensor 100. In this embodiment, sensor 100 comprises a system that can determine 1110 a silhouette image from a conventional image, using any of the methods described above. For example, the system may be a computer. As another example, the system may be a collection of CMOS sensors. Alternatively, step 1110 can be performed by, for example, central computer 120 or a local computer. In this embodiment, central computer 120 (or a local computer) receives a conventional image from sensor 100. Central computer 120 (or a local computer) then determines 1110 a silhouette image from the conventional image, using any of the methods described above.

The intersection of the silhouette image cone and the working volume is then determined 1120. The working volume is the volume of space in which people's presence will be detected. The intersection of a silhouette cone and the working volume is a three-dimensional shape that represents where an object might exist, based on a view of the object from a particular sensor 100. In one embodiment, the working volume is a rectangular prism that is located parallel to the floor (rectangular area 110). The height of the working volume can vary. In general, limiting the height of the working volume decreases the amount of resources necessary to compute the planar projection of the crowd's visual hull. In one embodiment, the height of the working volume is greater than or equal to the height of the tallest person, and the working volume begins at floor level. In another embodiment, the height of the working volume is three feet, and the working volume is centered at waist level (e.g., three feet above the floor). Methods of determining the intersection of three-dimensional shapes are known to those of ordinary skill in the art and are further described in Handbook of Discrete and Computational Geometry, Goodman and O'Rourke, Eds., CRC Press, 1997, pp. 599–630.

Step 1120 can be performed by, for example, an image sensor 100. In this embodiment, sensor 100 comprises a system that can determine 1120 the intersection of three-dimensional objects (a silhouette image cone and the working volume). For example, the system may be a computer. Alternatively, step 1120 can be performed by, for example, central computer 120 or a local computer. In this embodiment, central computer 120 (or a local computer) receives a silhouette image from sensor 100. Central computer 120 (or a local computer) then determines 1120 the intersection of the silhouette image cone and the working volume.

The projection of each intersection onto a plane is then determined 1130. As described above, the intersection is a three-dimensional shape that represents where an object might exist. The planar projection of this shape represents where an object might exist in a two-dimensional map. In one embodiment, the plane is the floor (rectangular area 110). In this embodiment, the planar projection of the intersection is similar to the area of floor space where an object might exist. Methods of determining planar projections of three-dimensional shapes are known to those of ordinary skill in the art.

Step 1130 can be performed by, for example, an image sensor 100. In this embodiment, sensor 100 comprises a system that can determine 1130 the projection of a three-dimensional object (the intersection of a silhouette cone and the working volume) onto a plane. For example, the system may be a computer. Alternatively, step 1120 can be performed by, for example, central computer 120 or a local computer. In this embodiment, central computer 120 (or a local computer) receives a representation of a three-dimensional object (the intersection of the silhouette image cone and the working volume) from sensor 100. Central computer 120 (or a local computer) then determines 1130 the projection of the three-dimensional object onto a plane.

Finally, the planar projections are aggregated 1140 to form a planar projection of the visual hull of the crowd. This step will be discussed below with reference to FIG. 8.

b. Placement of Sensors Within System

An image sensor 100 may be placed at any height and at any angle relative to an object. However, the location and orientation of an image sensor 100 affect the view of the object from that image sensor 100. Recall that an image sensor's view of an object is a silhouette that sweeps out a cone in three-dimensional space. As a result, the exact location of an object cannot be determined based on a silhouette of the object from only one image sensor 100. Specifically, the distance between the object and the image sensor 100 cannot be determined.

Figure 2A:
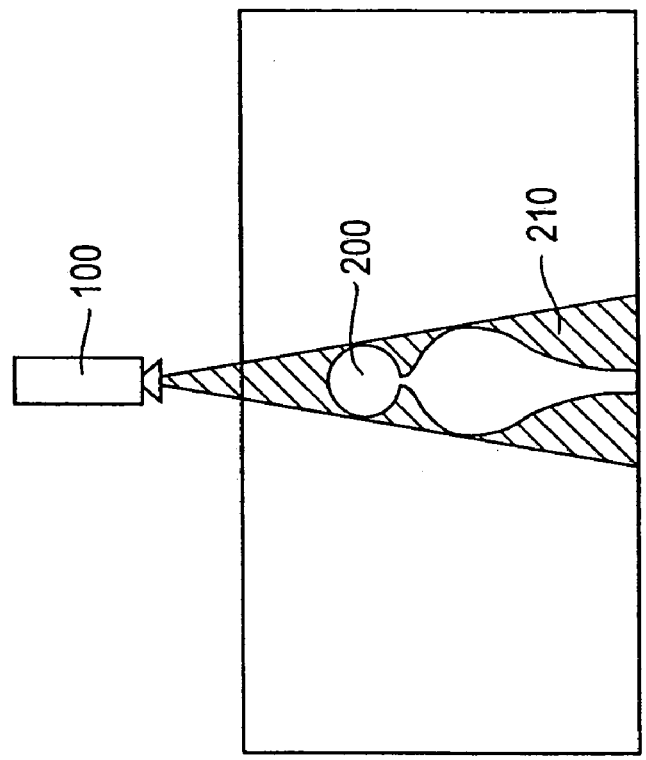
FIG. 2A illustrates a side view of an image sensor, a person, and a projected silhouette cone.

FIG. 2A illustrates a side view of an image sensor, a person, and a projected silhouette cone. In FIG. 2A, the image sensor 100 is positioned directly overhead the person 200 (e.g., mounted in a ceiling) and is oriented toward the floor. FIG. 2B illustrates a top view of the person and the projected silhouette cone in FIG. 2A. The top view of the projected silhouette cone 210 shown in FIG. 2B is also the silhouette image of the person 200 as seen from the image sensor 100. In addition, this silhouette is the planar projection of the person's visual hull.

If the ultimate goal were to use a silhouette image from an image sensor 100 to determine a planar projection of the visual hull of the person 200, then it would be preferable if the silhouette image were already equal to the desired planar projection. Thus, the preferred image sensor 100 placement would be directly overhead the person 200. In this configuration, the silhouette image would require no further processing in order to determine the planar projection of the visual hull of the person 200. However, as mentioned above, it is impractical to place image sensors 100 above crowds, for example, at outdoor venues. Note that in this configuration, the distance between the person 200 and the image sensor 100 cannot be determined. However, that is not a problem because the distance between the person 200 and the image sensor 100 is irrelevant to the planar projection of the person's visual hull.

Figure 3A:
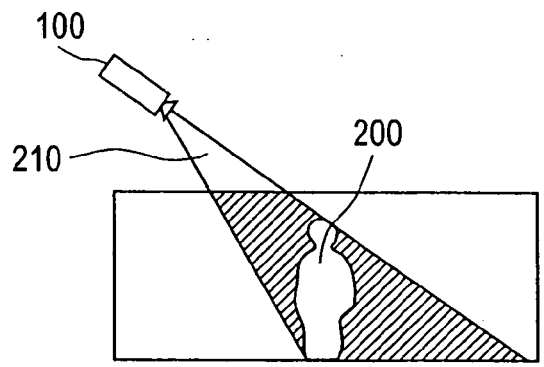
FIG. 3A illustrates a side view of an image sensor, a person, and a projected silhouette cone.
Figure 3B:
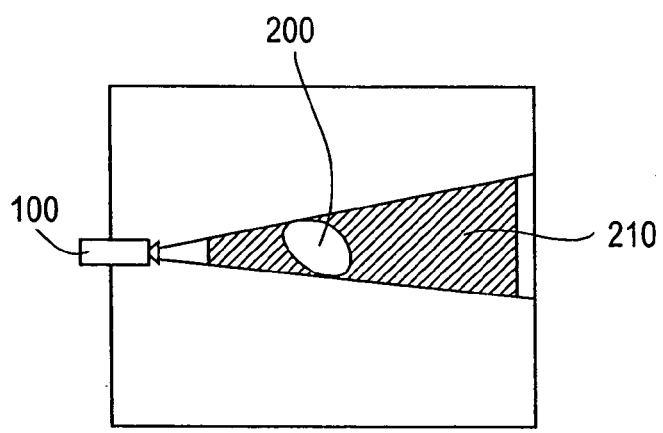
FIG. 3B illustrates a top view of the image sensor, person, and projected silhouette cone in FIG. 3A.

FIG. 3A illustrates a side view of an image sensor, a person, and a projected silhouette cone. In FIG. 3A, the image sensor 100 is positioned diagonally to the side of the person 200. FIG. 3B illustrates a top view of the image sensor, person, and projected silhouette cone in FIG. 3A. Note that the top view of the person 200 shown in FIG. 3B is not the same as the projection of the silhouette cone 210 as seen from the image sensor 100. Also, the silhouette image of the person 200 as seen from the image sensor 100 is not the planar projection of the person's visual hull. In this configuration, the distance between the person 200 and the image sensor 100 cannot be determined. However, unlike the configuration shown in FIGS. 2A and 2B, this is a problem because the distance between the person 200 and the image sensor 100 is relevant to the planar projection of the person's visual hull.

Figure 4A:
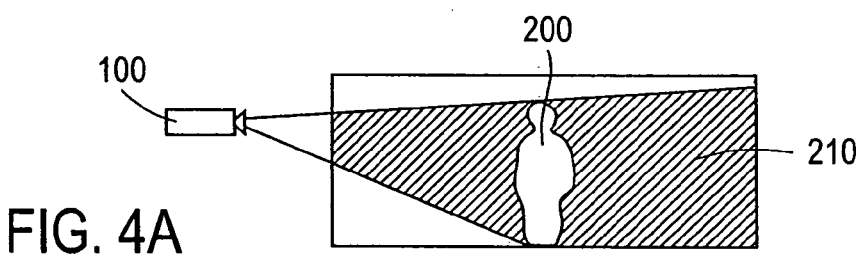
FIG. 4A illustrates a side view of an image sensor, a person, and a projected silhouette cone.
Figure 4B:
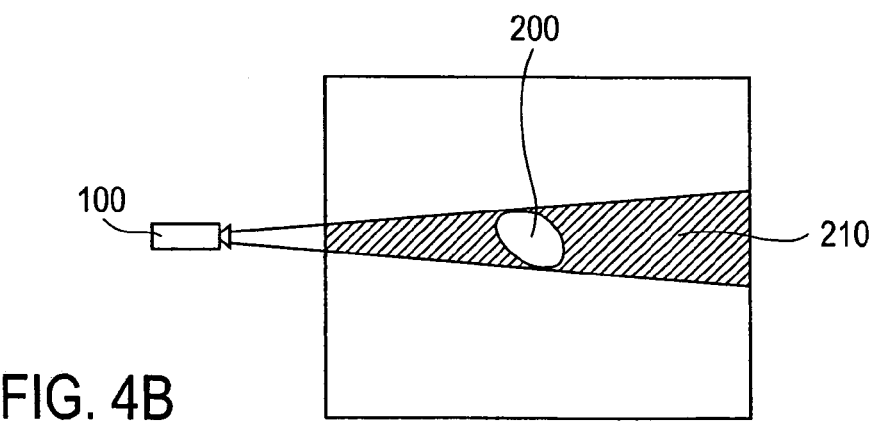
FIG. 4B illustrates a top view of the image sensor, person, and projected silhouette cone in FIG. 4A.

FIG. 4A illustrates a side view of an image sensor, a person, and a projected silhouette cone. In FIG. 4A, the image sensor 100 is oriented parallel to the floor, and the person 200 is inside the field of view. FIG. 4B illustrates a top view of the image sensor, person, and projected silhouette cone in FIG. 4A. Note that the top view of the person 200 shown in FIG. 4B is not the same as the projection of the silhouette cone as seen from the image sensor 100. Also, the silhouette image of the person 200 as seen from the image sensor 100 is not the planar projection of the person's visual hull. In this configuration, the distance between the person 200 and the image sensor 100 cannot be determined. However, unlike the configuration shown in FIGS. 2A and 2B, this is a problem because the distance between the person 200 and the image sensor 100 is relevant to the planar projection of the person's visual hull.

As mentioned above, an image sensor 100 may be placed at any height and at any angle relative to an object. In order to computer the planar projection of the visual hull of the crowd, though, points inside the working volume should be visible from at least two sensors 100. Obtaining views from multiple sensors 100 helps the system handle occlusions. For the sake of clarity, the invention will now be described in an embodiment where image sensors 100 are oriented parallel to the floor, similar to the configuration shown in FIGS. 4A and 4B.

Figure 5:
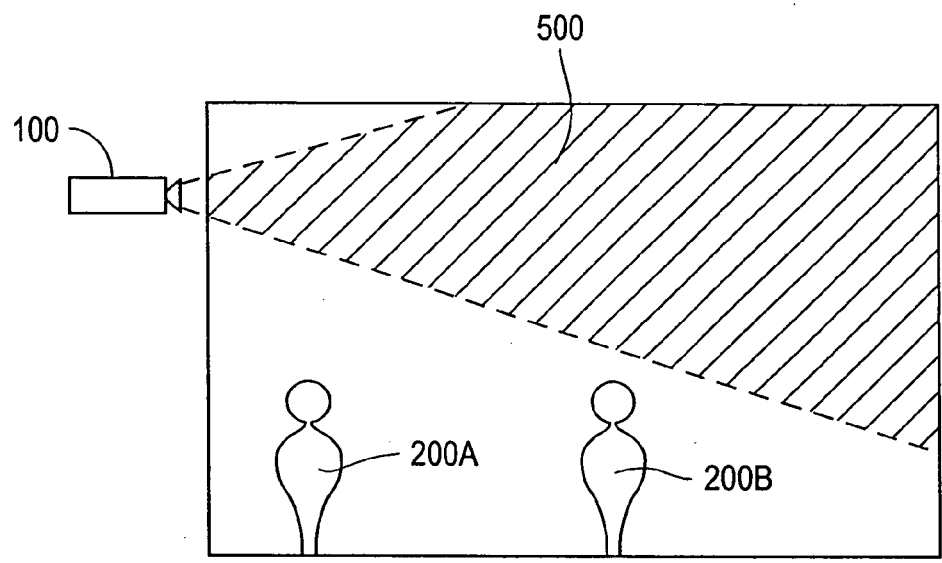
FIG. 5 illustrates a side view of an image sensor, the image sensor's field of view, and a person located in two different places.

In general, an image sensor 100 should be located such that a person in its field of view would produce a silhouette, and only one silhouette, even if the silhouette were incomplete. For example, if an image sensor 100 were located at ten feet above the ground level, a person who was five-feet tall would probably not be in the sensor's field of view, whether the person was located closer to or farther from the sensor 100. FIG. 5 illustrates a side view of an image sensor, the image sensor's field of view, and a person located in two different places. In FIG. 5, the image sensor 100 is oriented parallel to the floor, and the person 200 is outside the field of view 500 in both the first position 200A and the second position 200B. Of course, the person 200 may be inside the field of view of a second image sensor 100 (not shown). In general, area 110 should be well covered by the image sensors 100, but it is not necessary that all image sensors 100 cover all locations within area 110. Similarly, an image sensor 100 should not "see" two objects representing only one person. If an image sensor 100 were placed at ground level, a person 200 who was walking in its field of view 200 might appear as two objects (a left leg and a right leg). As a result, in one embodiment, an image sensor 100 is placed about three feet off of the ground. At this height, a sensor 100 should be able to see a person's torso.

2. Architecture of Apparatus for Determining the Number of People in a Crowd

Figure 6:
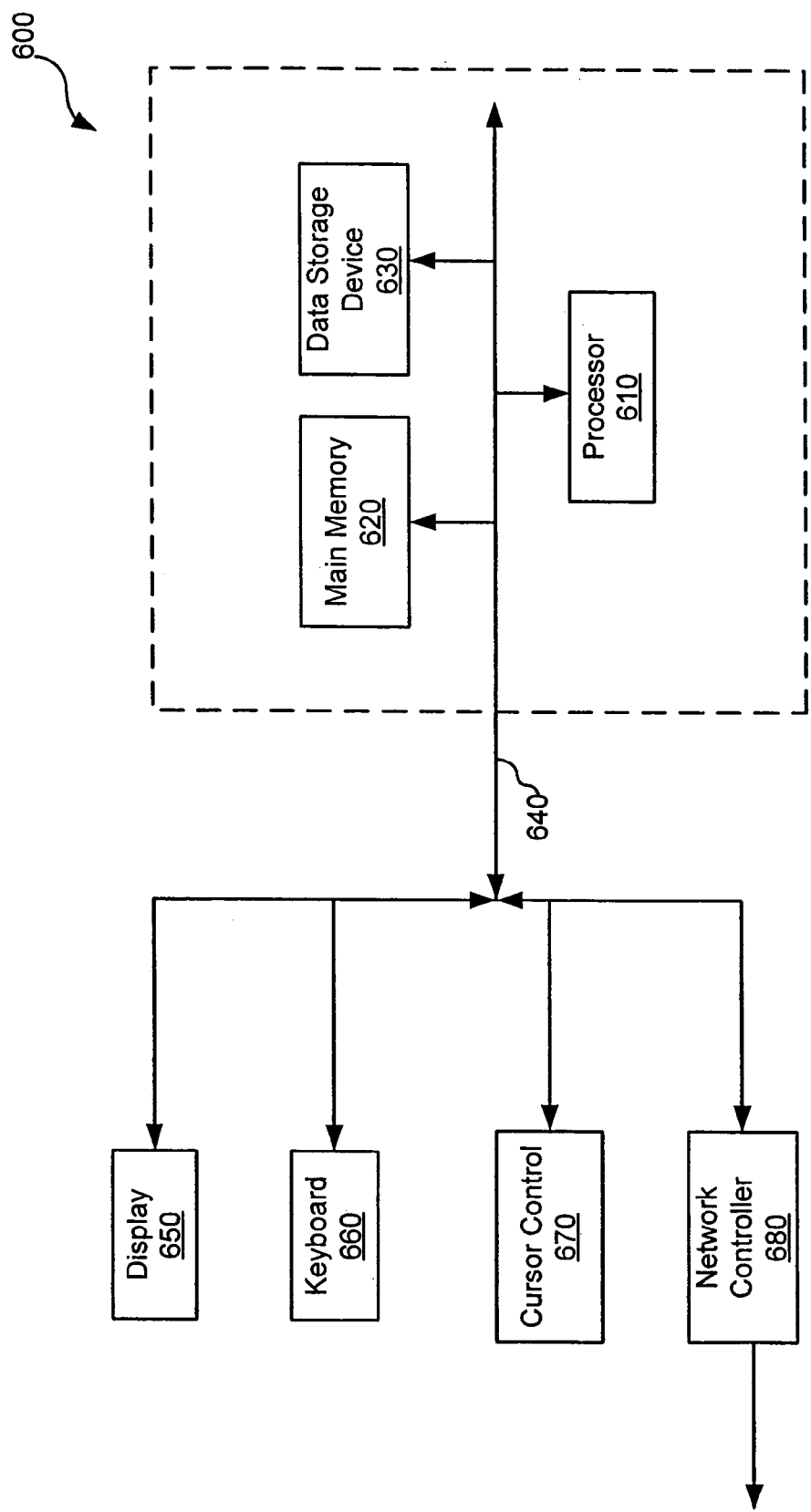
FIG. 6 illustrates a block diagram of an apparatus for determining the number of people in a crowd based on a planar projection of the crowd's visual hull, according to one embodiment of the invention.

FIG. 6 illustrates a block diagram of an apparatus for determining the number of people in a crowd based on a planar projection of the crowd's visual hull, according to one embodiment of the invention. Apparatus 600 preferably includes a processor 610, a main memory 620, a data storage device 630, and an input/output controller 680, all of which are communicatively coupled to a system bus 640. Apparatus 600 can be, for example, a general-purpose computer.

Processor 610 processes data signals and comprises various computing architectures including a complex instruction set computer (CISC) architecture, a reduced instruction set computer (RISC) architecture, or an architecture implementing a combination of instruction sets. Although only a single processor is shown in FIG. 6, multiple processors may be included.

Main memory 620 stores instructions and/or data that are executed by processor 610. The instructions and/or data comprise code for performing any and/or all of the techniques described herein. Main memory 620 is preferably a dynamic random access memory (DRAM) device, a static random access memory (SRAM) device, or some other memory device known in the art.

Data storage device 630 stores data and instructions for processor 610 and comprises one or more devices including a hard disk drive, a floppy disk drive, a CD-ROM device, a DVD-ROM device, a DVD-RAM device, a DVD-RW device, a flash memory device, or some other mass storage device known in the art.

Network controller 680 links apparatus 600 to other devices so that apparatus 600 can communicate with these devices.

System bus 640 represents a shared bus for communicating information and data throughout apparatus 600. System bus 640 represents one or more buses including an industry standard architecture (ISA) bus, a peripheral component interconnect (PCI) bus, a universal serial bus (USB), or some other bus known in the art to provide similar functionality.

Additional components that may be coupled to apparatus 600 through system bus 640 include a display device 650, a keyboard 660, and a cursor control device 670. Display device 650 represents any device equipped to display electronic images and data to a local user or maintainer. Display device 650 is a cathode ray tube (CRT), a liquid crystal display (LCD), or any other similarly equipped display device, screen, or monitor. Keyboard 660 represents an alphanumeric input device coupled to apparatus 600 to communicate information and command selections to processor 610. Cursor control device 670 represents a user input device equipped to communicate positional data as well as command selections to processor 610. Cursor control device 670 includes a mouse, a trackball, a stylus, a pen, cursor direction keys, or other mechanisms to cause movement of a cursor.

It should be apparent to one skilled in the art that apparatus 600 includes more or fewer components than those shown in FIG. 6 without departing from the spirit and scope of the present invention. For example, apparatus 600 may include additional memory, such as, for example, a first or second level cache or one or more application specific integrated circuits (ASICs). As noted above, apparatus 600 may be comprised solely of ASICs. In addition, components may be coupled to apparatus 600 including, for example, image scanning devices, digital still or video cameras, or other devices that may or may not be equipped to capture and/or download electronic data to/from apparatus 600.

Figure 7:
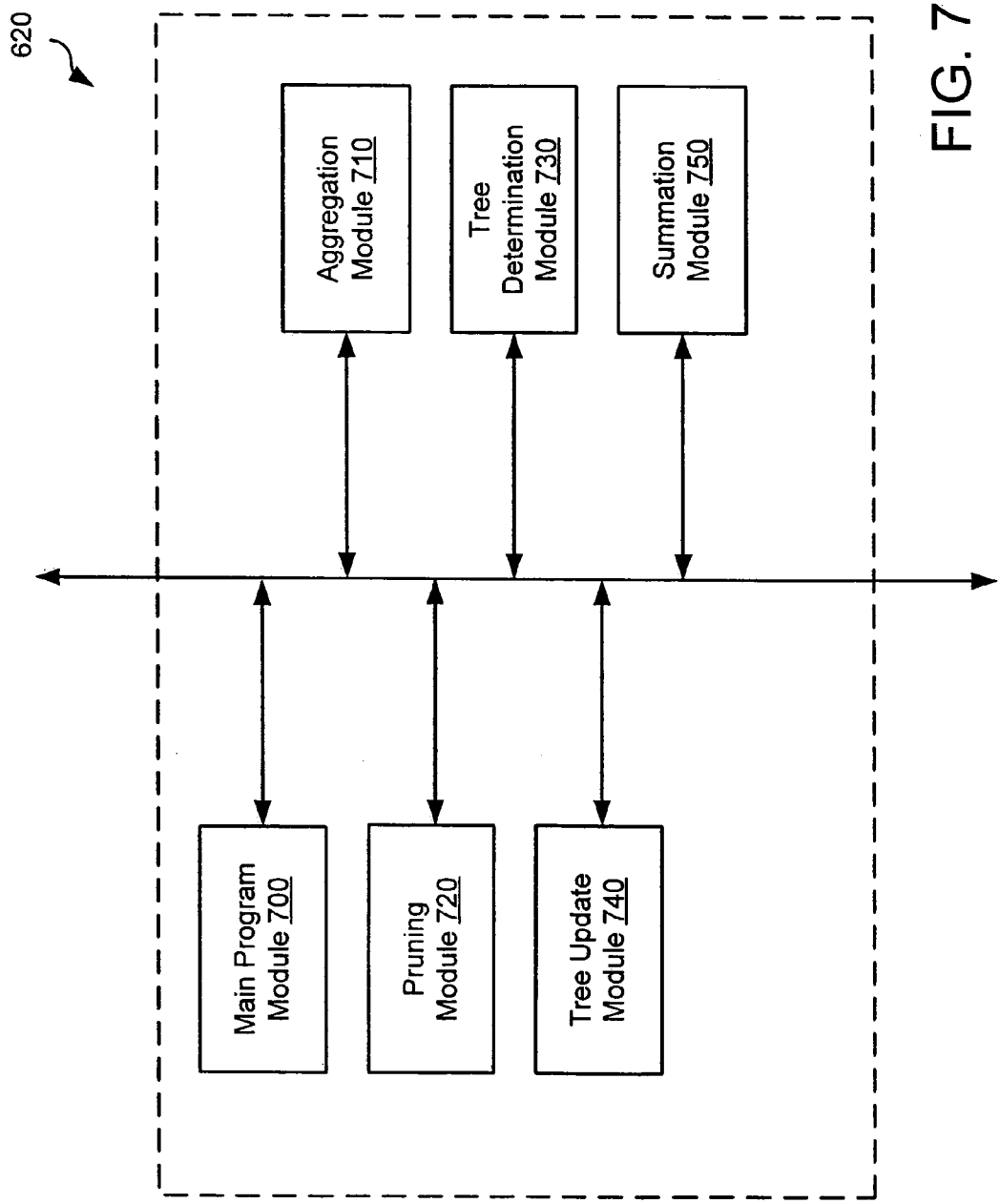
FIG. 7 illustrates a more detailed block diagram of the contents of the memory unit in FIG. 6.

FIG. 7 illustrates a more detailed block diagram of the contents of the memory unit in FIG. 6. Generally, memory unit 620 comprises several code modules for determining the number of people in a crowd based on a planar projection of the crowd's visual hull. In one embodiment, memory unit 620 approximates the planar projection of the visual hull of the crowd based on planar projections of the intersections of silhouette cones and the working volume. Specifically, the code modules in memory unit 620 include main program module 700, aggregation module 710, pruning module 720, tree determination module 730, tree update module 740, and summation module 750.

All code modules 710, 720, 730, 740, 750 are communicatively coupled to main program module 700. Main program module 700 centrally controls the operation and process flow of apparatus 600, transmitting instructions and data to as well as receiving data from each code module 710, 720, 730, 740, 750. Details of the operation of main program module 700 will be discussed below with reference to FIG. 8.

Aggregation module 710 aggregates a plurality of two-dimensional maps that contain the planar projections of silhouette cone-working volume intersections. Each two-dimensional map includes an area where people might exist, based on the view from one sensor 100. This area is the planar projection of the silhouette cone-working volume intersection. The aggregation "intersects" the maps, which is similar to overlaying them on one another and seeing where the silhouette cones overlap.

Figure 9:
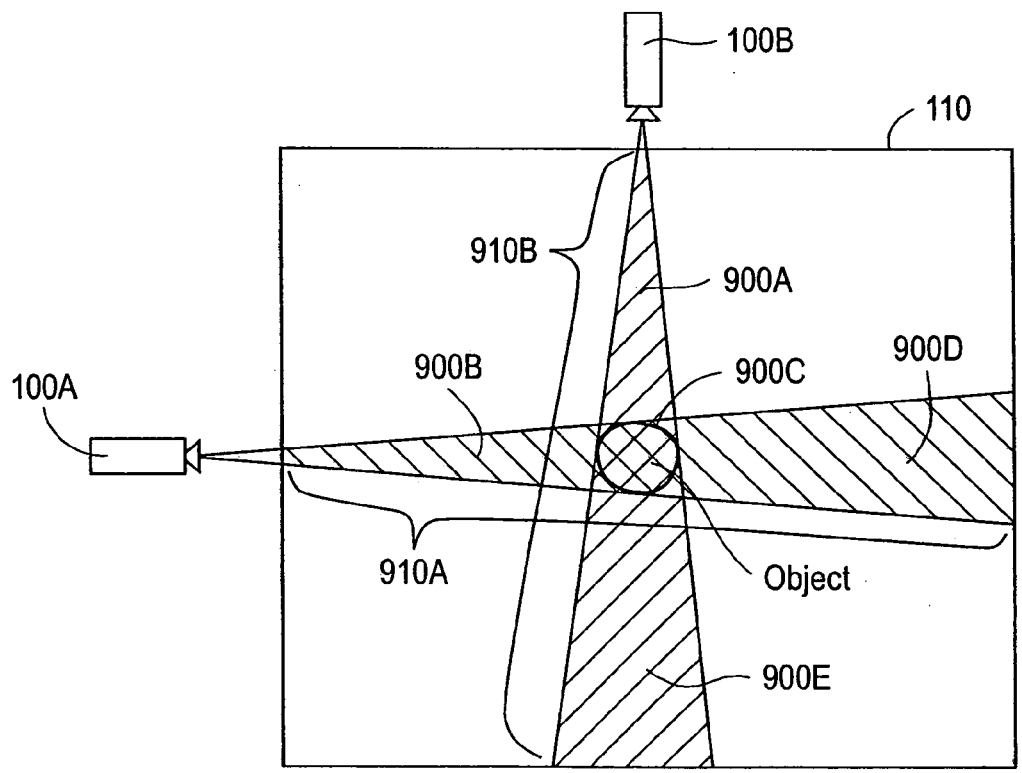
FIG. 9 illustrates a top view of two image sensors, one object, and the silhouette cones of the object.

FIG. 9 illustrates a top view of two image sensors, one object, and the silhouette cones of the object. In the illustrated embodiment, the silhouette cones are wedge-shaped. When multiple sensors 100 surround area 110, the wedge-shaped silhouette cones 910A and 910B intersect (overlap) and form a subdivision pattern, dividing area 110 into several polygons 900A, 900B, 900C, 900D, and 900E. In the illustrated embodiment, silhouette cone 910A comprises polygons 900B, 900C, and 900D, while silhouette cone 910B comprises polygons 900A, 900C, and 900E. Thus, sensor 100A can determine that an object is located somewhere within polygons 900B, 900C, and 900D, while sensor 100B can determine that an object is located somewhere within polygons 900A, 900C, and 900E. Together, information from sensors 100A and 100B can be aggregated to determine that an object is located within polygon 900C.

In one embodiment, the subdivision described above is determined exactly. In this embodiment, the borders of the silhouette cones are represented as lines. These lines, when intersected, form the perimeters of the polygons. In another embodiment, the subdivision is an approximation. In this embodiment, the two-dimensional maps are pixelated so that the silhouette cones become "patches" of pixels. Pixelation, also called rasterization or scan conversion, is known to those of ordinary skill in the art and is further described in Graphics Gems, A. Glassner, Ed., Morgan Kaufmann, 1998, pp. 75–97.

In general, exact subdivision is more difficult to implement algorithmically, requires fewer computing resources, and is less able to handle errors. In contrast, pixelation is easier to implement, requires more computing resources, and is more able to handle errors. In one embodiment, specialized graphics hardware is used to pixelate the maps and intersect them. When specialized graphics hardware is used for pixelation, the amount of computing resources required is vastly reduced.

Aggregation module 710 aggregates information from several sensors by intersecting their maps. The resulting intersection is an approximation of the crowd's visual hull. In one embodiment, aggregation module 710 requires strict consensus when determining that an object may be present. In this embodiment, all maps (sensor views) that cover a particular polygonal area must agree that an object may be present in that area. Even if only one sensor indicates that there is no object in that area, then aggregation module 710 determines that no object is present. In another embodiment, aggregation module 710 uses a voting scheme. In this embodiment, the number of maps indicating that an object may be present is compared to the number of maps indicating that an object is not present. If the number or percentage of "object-present" maps is higher than a threshold value, then aggregation module 710 determines that an object may be present in that area.

In one embodiment, a local computer is used to aggregate a subset of the total number of two-dimensional maps. This embodiment enables distributed aggregation of views from sensors 100. Aggregations from local computers can then be aggregated at central computer 120.

Figure 10A:
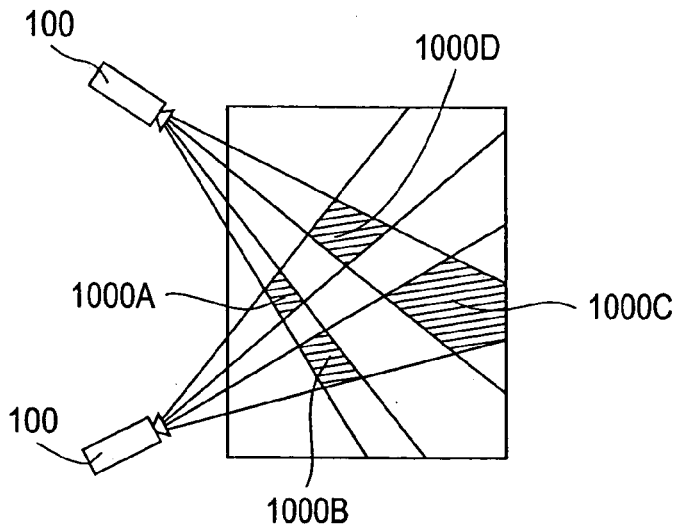
FIG. 10A illustrates a top view of two image sensors and their projected silhouette cones, with no objects present.
Figure 10B:
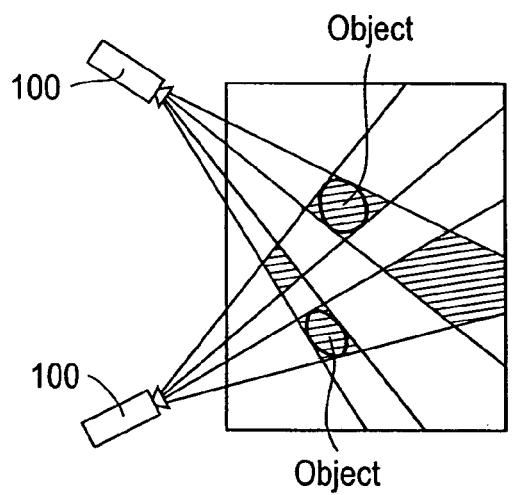
FIG. 10B illustrates a top view of the projected silhouette cones from FIG. 10A and multiple objects in a first configuration.
Figure 10C:
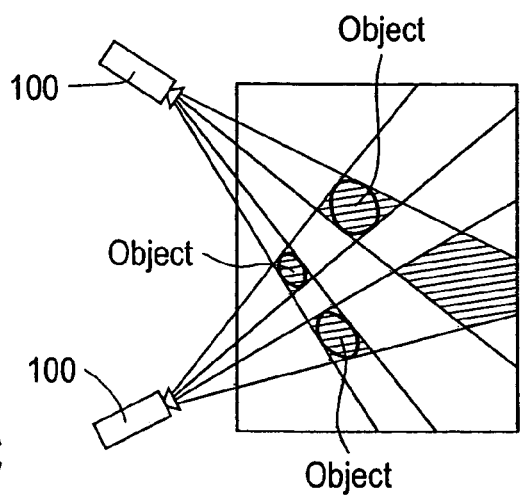
FIG. 10C illustrates a top view of the projected silhouette cones from FIG. 10A and multiple objects in a second configuration.
Figure 10D:
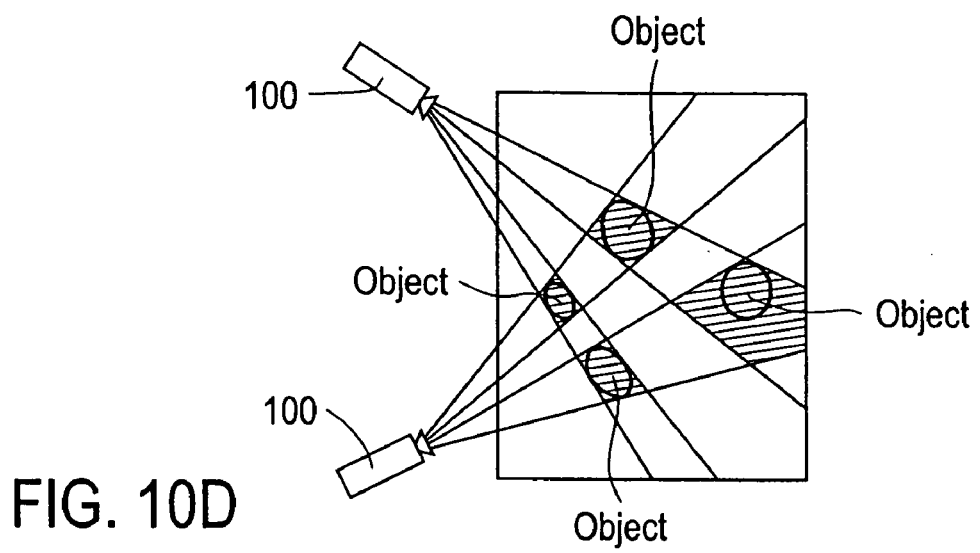
FIG. 10D illustrates a top view of the projected silhouette cones from FIG. 10A and multiple objects in a third configuration.
Figure 10E:
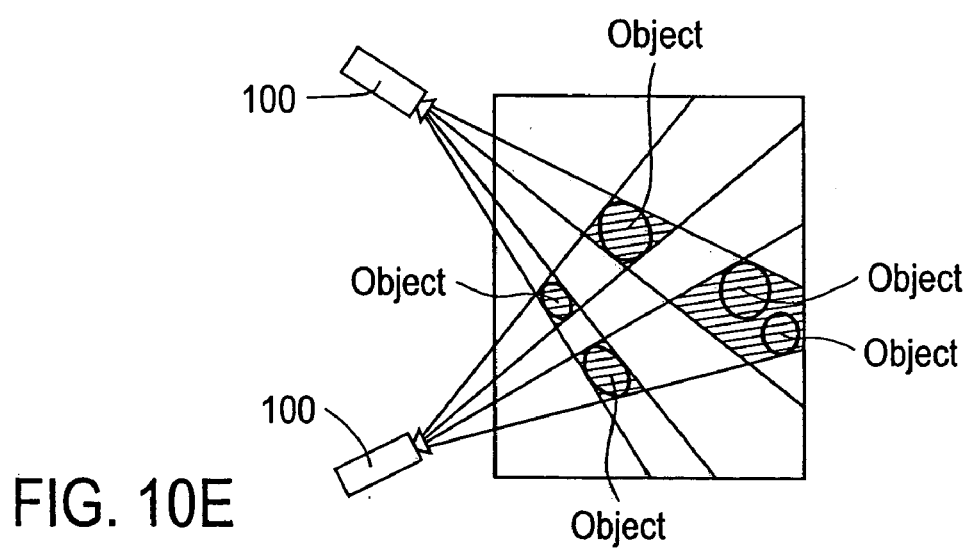
FIG. 10E illustrates a top view of the projected silhouette cones from FIG. 10A and multiple objects in a fourth configuration.

FIG. 10A illustrates a top view of two image sensors and their projected silhouette cones, with no objects present. Polygonal areas 1000A, 1000B, 1000C, and 1000D represent where an object may be present. In other words, polygonal areas 1000A, 1000B, 1000C, and 1000D are the projected visual hull of an object. Note that more than one object may be present in polygonal areas 1000A, 1000B, 1000C, and 1000D. The projected visual hull is ambiguous, because several arrangements of objects can be consistent with a given visual hull. FIG. 10B illustrates a top view of the projected silhouette cones from FIG. 10A and multiple objects in a first configuration. FIG. 10C illustrates a top view of the projected silhouette cones from FIG. 10A and multiple objects in a second configuration. FIG. 10D illustrates a top view of the projected silhouette cones from FIG. 10A and multiple objects in a third configuration. FIG. 10E illustrates a top view of the projected silhouette cones from FIG. 10A and multiple objects in a fourth configuration. Each of the object configurations in FIGS. 10B, 10C, 10D, and 10E is consistent with the projected visual hull in FIG. 10A.

Figure 12A:
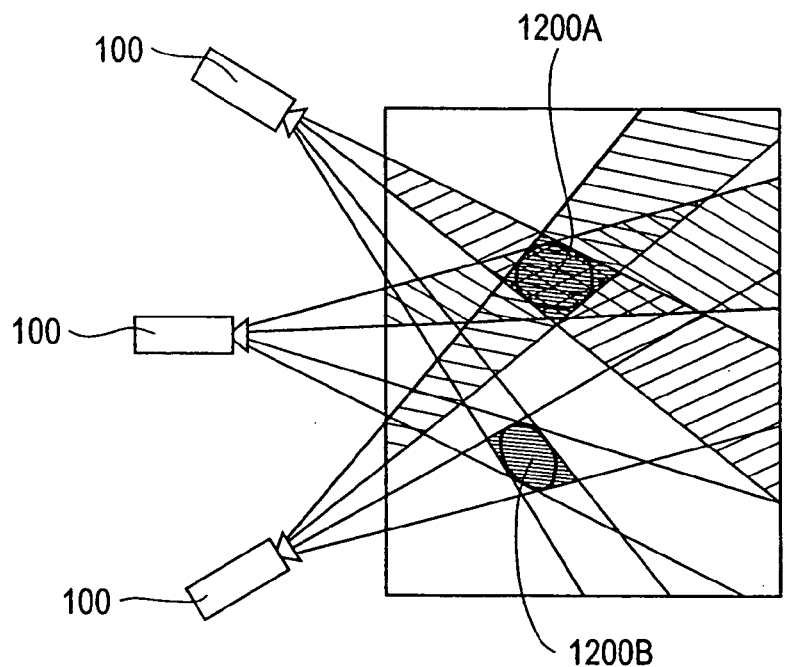
FIG. 12A illustrates a top view of three image sensors, their projected silhouette cones, and multiple objects.
Figure 12B:
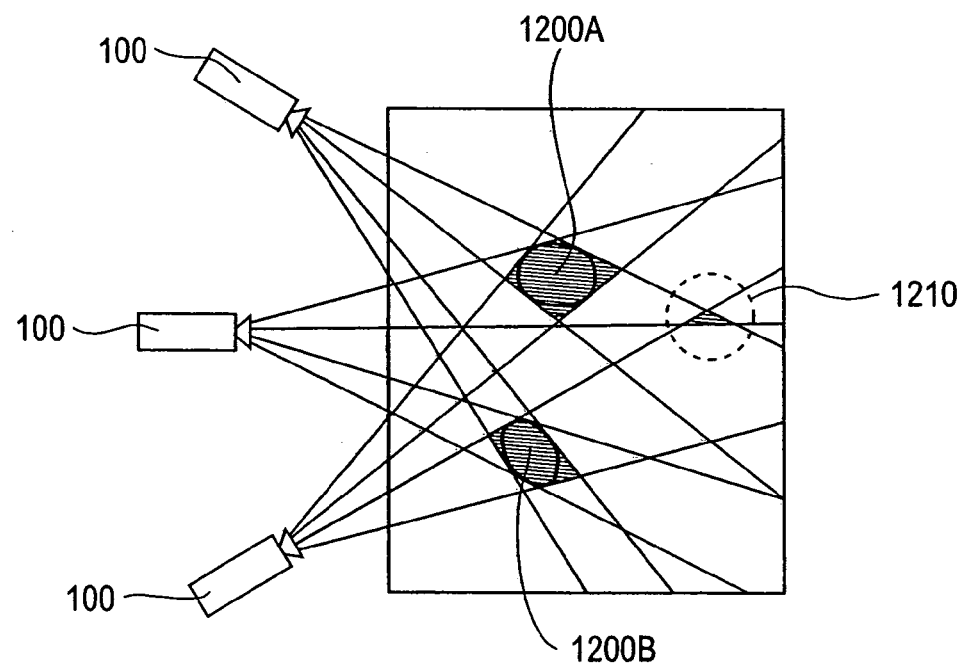
FIG. 12B illustrates a top view of three image sensors, their projected silhouette cones, multiple objects, and a "phantom" polygon.

Pruning module 720 determines which polygonal areas of the projected visual hull are actually empty and removes them from the projection. These polygonal areas are known as phantoms. One type of phantom is identified based on size. For example, polygons that are smaller than the minimum object size are removed. Another type of phantom is identified based on temporal coherence. For example, polygons that appear from nowhere (e.g., from one second to the next) are removed. This type of phantom is a property of three or more sensors 100. FIG. 12A illustrates a top view of three image sensors, their projected silhouette cones, and multiple objects. FIG. 12B illustrates a top view of three image sensors, their projected silhouette cones, multiple objects, and a "phantom" polygon. Two objects 1200A and 1200B are observed in two successive time steps (first FIG. 12A, then FIG. 12B), and a phantom 1210 appears in FIG. 12B. In one embodiment, the temporal coherence of a polygon is checked by testing whether it intersects a polygon in a previous time view (e.g., FIG. 12A). This test assumes that an object cannot leave the area created by its visual hull in one time step. In one embodiment, this maximum speed assumption is adjusted by growing the polygons in the previous time step before computing the intersection.

If sensor images contain occlusions (e.g., if some people block other people from being seen by sensors 100), then it is impossible to determine the exact number of people in the crowd. Instead, in one embodiment, the number of people in a crowd is determined by bounding the number of people present inside each polygon. Tree determination module 730 determines upper and lower bounds of the number of people in each polygon.

Upper Bound Constraint (UBC)—In one embodiment, a polygon's upper bound constraint is the area of the polygon divided by the minimum object size. This bound is very loose because it assumes the worst possible scenario: objects cluster and move collusively together as a single target. This bound also assumes that objects fill the entire area of the polygon regardless of their geometry (similar to how a liquid fills an unusually-shaped container).

Lower Bound Constraint (LBC)—a polygon contains at least one object if there exists a ray from an image sensor 100 that intersects only that polygon. This is because a ray from an image sensor 100 intersects a polygon only if the corresponding line of sight was blocked by an object. If only one polygon intersects that ray, then the object must be contained in the polygon. This constraint is different from the UBC because it counts objects directly. (A real object was observed along a ray and counted). In contrast, the UBC hypothesizes about the maximum number of objects that could fill a polygon.

In one embodiment, tree determination module 730 stores upper and lower bounds in a data structure. Although a particular value of LBC indicates whether a polygon contains at least one object, LBC's behavior over time conveys additional information. In another embodiment, the data structure is updated at each time step. In yet another embodiment, this data structure is a tree ($\tau$). By propagating the lower bounds along the tree, the number of objects in area 110 can be further constrained (e.g., the lower bounds can be made tighter).

In one embodiment, at time t, each leaf in the tree stores a newly observed polygon and its associated object bounds. A node in the tree represents the implicit union of all the polygons of its descendants. It contains the bounds to the number of objects inside this union. From this, there are four properties on the object bounds across the tree:

$$l_i = \max\left(l_i, \sum_{\forall j \in children(i)} l_j\right) \quad (1)$$

$$l_i = \max\left(l_i, l_{parent(i)} - \sum_{\forall j \in siblings(i)} u_j\right) \quad (2)$$

$$u_i = \min\left(u_i, \sum_{\forall j \in children(i)} u_j\right) \quad (3)$$

$$u_i = \min\left(u_i, u_{parent(i)} - \sum_{\forall j \in siblings(i)} l_j\right) \quad (4)$$

Equation (1) states that if there are at least $\Sigma l_j$ objects in the children polygons, then the original parent must contain at least this many objects. Equation (2) states that if there are at least $l_{parent}$ objects in the parent, and $\Sigma u_{siblings}$ objects fit inside the sibling polygons, then the difference must be in the child. Reverse constraints apply for the upper bounds. At the leaf level, the constraints UBC and LBC are for individual polygons as described before.

Tree update module 740 updates the data structure that stores the upper and lower bounds as time passes. Let $\tau$ be the structure of the tree at time t. Let $\Pi(t+1)$ be the polygons observed at time t+1. $\tau$ is updated in three steps: add new leaves to $\tau$, remove redundant nodes from $\tau$, and update bounds across $\tau$.

Add Leaves—Each P $\in \Pi(t+1)$ is added as a leaf to $\tau$ using the following operations:

ADD (P) TO (Q): P intersects exactly one polygon Q $\in \Pi(t)$—that is, objects in P must have originated from Q. P is added as a child of Q. The bounds of the new leaf containing P are initialized by UBC and LBC.

Figure 13:
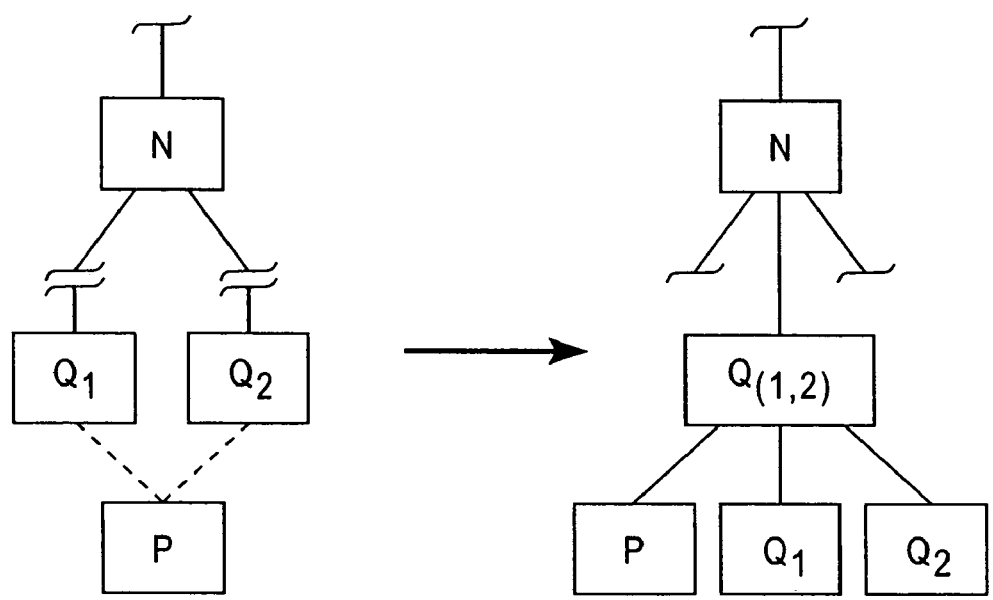
FIG. 13 illustrates a diagram of a tree data structure, according to one embodiment of the invention.

ADD (P) TO (Q$_1$, Q$_2$): P intersects exactly two polygons {Q$_1$, Q$_2$}$\in \Pi(t)$. Objects in either Q$_1$, or Q$_2$ could have moved to P. Adding P as a child to both Q$_1$ and Q$_2$ creates a cycle in $\tau$. Instead, we create a new node Q$_{(1,2)}$, added as a child to node N $\in$ T—the closest common ancestor of Q$_1$, and Q$_2$. Now P, Q$_1$, and Q$_2$ become children of Q$_{(1,2)}$. This is shown in FIG. 13. The bounds of the leaf containing P are initialized by UBC and LBC. Additionally, in order to keep the properties of the tree correct, the bounds of Q$_{(1,2)}$ are initialized to be the combined bounds of Q$_1$ and Q$_2$. The lower bounds of all the nodes along the path from Q$_1$, to Q$_2$(before they were moved) are decreased by the upper bound of P. These include Q$_1$, and Q$_2$, but not N.

ADD (P) TO (Q$_l$, ..., Q$_k$): P intersects {Q$_l$, ..., Q$_k$}$\in \Pi(t)$. This is handled by several nested calls to ADD. Initially, ADD (P) TO (Q$_1$, Q$_2$) is called. For subsequent calls, P is removed from Q$_{(i-1,i)}$, and ADD (P) TO (Q$_{(i-1,i)}$, Q$_{i+1}$) is called.

Remove Redundant—Once all new polygons in $\Pi(t+1)$ are added, we proceed to remove those nodes in $\tau$ that are redundant:

REMOVE REDUNDANT($\tau$): Every element N $\in \tau$ with one child or less is removed, unless N$\in \Pi(\tau+1)$ (i.e., N is a newly added polygon). The bounds for the child of N (if any) are updated to be the tighter among the two.

This stage guarantees that only those polygons in $\Pi(\tau+1)$ are leaves of $\tau$, and that any other node in $\tau$ has at least two children. Therefore, the number of leaves in $\tau$ is equal to the number of observed polygons n, the depth of the tree is less than or equal to n, and |$\tau$|<2n.

Update Bounds—Object bounds are updated across the tree to ensure that Equations (1–4) hold for every node. This involves two sweeps: First, new information from the leaves is propagated up to the root of $\tau$. Afterwards, the updated bounds for the root are propagated back down to the leaves.

Summation module 750 returns the lower bound for the root node of tree $\tau$. This number is the number of people in the crowd.

3. Method for Determining the Number of People in a Crowd

Figure 8:
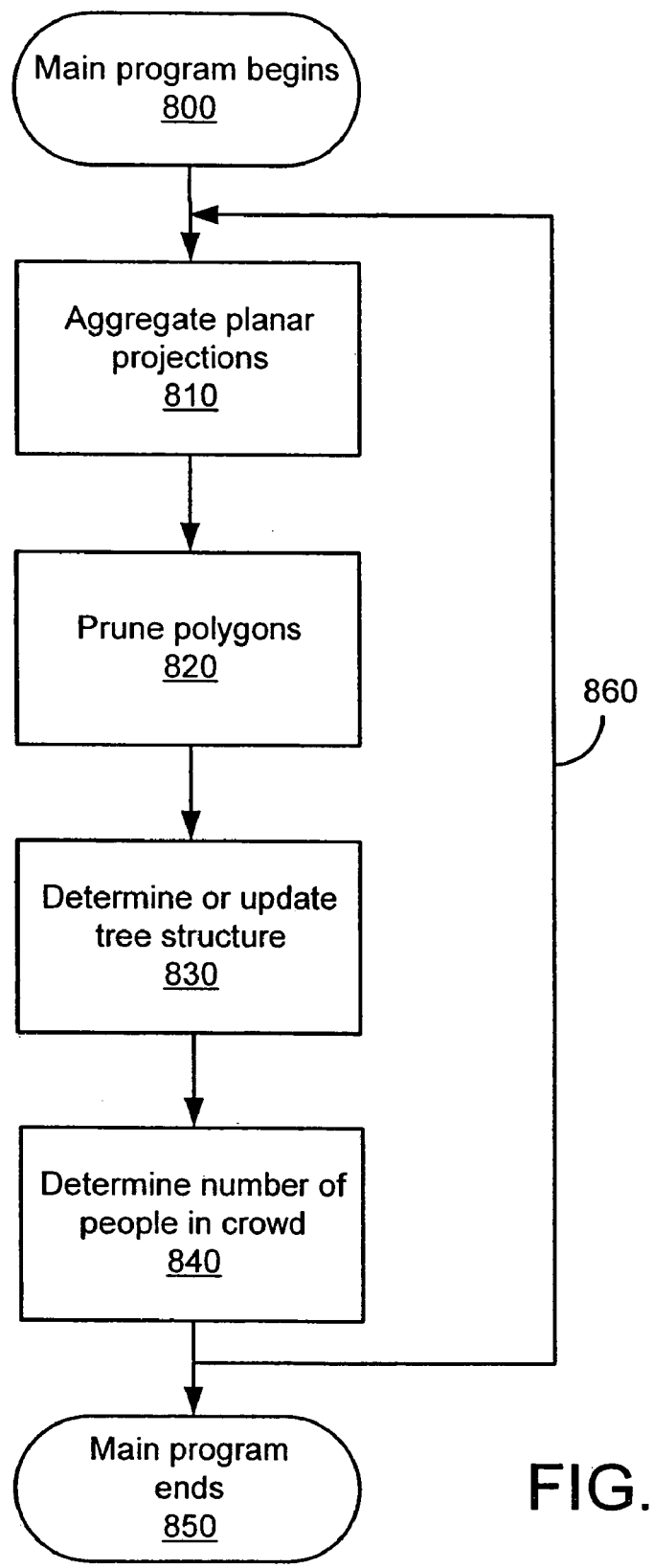
FIG. 8 illustrates a method for determining the number of people in a crowd, according to one embodiment of the invention.

FIG. 8 illustrates a method for determining the number of people in a crowd, according to one embodiment of the invention. When the method begins, planar projections of the intersections of the silhouette cones and the working volume have already been determined, as described in step 1130.

In the first step, main program module 700 begins 800. Main program module 700 instructs aggregation module 710 to aggregate 810 the plurality of two-dimensional maps that are the planar projections of silhouette cone-working volume intersections. Then, main program module 700 instructs pruning module 720 to prune 820 the polygons by determining which polygons of the projected visual hull are actually empty and removing them from the projection.

Main program module 700 then instructs tree determination module 730 to determine 830 a tree data structure by storing upper and lower bounds. Main program module 700 then determines 840 the number of people in the crowd using summation module 750.

If desired, planar projections of the intersections of the silhouette cones and the working volume are re-determined at a later point in time. The method returns 860 to step 810 and repeats steps 810 and 820. Then, main program module 700 instructs tree update module 740 to update 830 the tree data structure. If there are no more time steps, main program module 700 ends 850.

Although the invention has been described in considerable detail with reference to certain embodiments thereof, other embodiments are possible as will be understood to those skilled in the art. For example, another embodiment is described in "Counting People in Crowds with a Real-Time Network of Simple Image Sensors" by D. Yang, H. González-Baños, and L. Guibas, Proceedings of the Ninth IEEE International Conference on Computer Vision (ICCV), Nice, France, Oct. 13–16, 2003, pp. 122–129 and CD-ROM, which is hereby incorporated by reference.

What is claimed is:

1. A method for determining the number of a plurality of objects in a working volume, the method comprising:
   determining a first planar projection of a first visual hull of the plurality of objects, the planar projection comprising a first set of one or more shapes; and
   determining a first set of one or more lower bounds, a lower bound being associated with a shape in the first set of one or more shapes, a lower bound being a lowest number of objects that can be contained in the associated shape.

2. The method of claim 1, wherein determining the first planar projection of the first visual hull of the plurality of objects comprises intersecting a plurality of planar projections of three-dimensional shapes.

3. The method of claim 2, wherein intersecting the plurality of planar projections of three-dimensional shapes comprises pixelating a planar projection of a three-dimensional shape.

4. The method of claim 3, wherein pixelating the planar projection of the three-dimensional shape comprises using hardware to pixelate the planar projection of the three-dimensional shape.

5. The method of claim 2, wherein a three-dimensional shape is an intersection of the working volume and a silhouette cone of an object.

6. The method of claim 2, wherein a three-dimensional shape is an intersection of the working volume and a silhouette cone of an object.

7. The method of claim 1, wherein the working volume does not contain all objects completely.

8. The method of claim 1, wherein determining the first set of one or more lower bounds comprises determining whether a ray exists that extends along a silhouette cone and intersects only one shape.

9. The method of claim 1, further comprising removing one or more shapes from the first set of one or more shapes, responsive to determining that the one or more shapes contains no objects.

10. The method of claim 1, further comprising determining a first set of one or more upper bounds, an upper bound being associated with a shape in the first set of one or more shapes, an upper bound being a highest number of objects that can be contained in the associated shape.

11. The method of claim 10, wherein determining the first set of one or more upper bounds comprises dividing the area of a shape by a minimum object size.

12. The method of claim 1, further comprising:
   storing the first set of one or more lower bounds in a data structure;
   determining a second planar projection of a second visual hull of the plurality of objects, the second planar projection comprising a second set of one or more shapes; and
   determining a second set of one or more lower bounds, a lower bound being associated with a shape in the second set of one or more shapes, a lower bound being a lowest number of objects that can be contained in the associated shape.

13. The method of claim 12, wherein the working volume does not contain all objects completely.

14. The method of claim 12, wherein determining the second set of one or more lower bounds comprises determining whether a ray exists that extends along a silhouette cone and intersects only one shape.

15. The method of claim 12, further comprising removing one or more shapes from the second set of one or more shapes, responsive to determining that the one or more shapes contains no objects.

16. The method of claim 12, further comprising determining a second set of one or more upper bounds, an upper bound being associated with a shape in the second set of one or more shapes, an upper bound being a highest number of objects that can be contained in the associated shape.

17. The method of claim 16, wherein determining the second set of one or more upper bounds comprises dividing the area of a shape by a minimum object size.

18. The method of claim 12, further comprising updating the data structure.

19. The method of claim 18, wherein the data structure comprises a tree data structure, a node of the tree data structure being associated with a shape in the first set of one or more shapes.

20. The method of claim 19, wherein a node of the tree data structure comprises a lower bound of the associated shape.

21. The method of claim 19, wherein anode of the tree data structure comprises an upper bound of the associated shape.

22. The method of claim 19, wherein updating the data structure comprises one element of a group containing:
   adding a node to the data structure;
   removing a node from the data structure; and
   updating a node in the data structure.

23. A system for determining the number of a plurality of objects in a working volume, the system comprising:
   means for determining a first planar projection of a first visual hull of the plurality of objects, the planar projection comprising a first set of one or more shapes; and
   means for determining a first set of one or more lower bounds, a lower bound being associated with a shape in the first set of one or more shapes, a lower bound being a lowest number of objects that can be contained in the associated shape.

24. The system of claim 23, wherein the means for determining the first planar projection of the first visual hull of the plurality of objects comprises means for intersecting a plurality of planar projections of three-dimensional shapes.

25. The system of claim 24, wherein intersecting the plurality of planar projections of three-dimensional shapes comprises pixelating a planar projection of a three-dimensional shape.

26. The system of claim 25, wherein pixelating the planar projection of the three-dimensional shape comprises using hardware to pixelate the planar projection of the three-dimensional shape.

27. The system of claim 23, wherein the working volume does not contain all objects completely.

28. The system of claim 23, wherein the means for determining the first set of one or more lower bounds comprises means for determining whether a ray exists that extends along a silhouette cone and intersects only one shape.

29. The system of claim 23, further comprising means for removing one or more shapes from the first set of one or more shapes, responsive to determining that the one or more shapes contains no objects.

30. The system of claim 23, further comprising means for determining a first set of one or more upper bounds, an upper bound being associated with a shape in the first set of one or more shapes, an upper bound being a highest number of objects that can be contained in the associated shape.

31. The system of claim 30, wherein the means for determining the first set of one or more upper bounds comprises means for dividing the area of a shape by a minimum object size.

32. The system of claim 23, further comprising:
means for storing the first set of one or more lower bounds in a data structure;
means for determining a second planar projection of a second visual hull of the plurality of objects, the second planar projection comprising a second set of one or more shapes; and
means for determining a second set of one or more lower bounds, a lower bound being associated with a shape in the second set of one or more shapes, a lower bound being a lowest number of objects that can be contained in the associated shape.

33. The system of claim 32, wherein the working volume does not contain all objects completely.

34. The system of claim 32, wherein the means for determining the second set of one or more lower bounds comprises means for determining whether a ray exists that extends along a silhouette cone and intersects only one shape.

35. The system of claim 32, further comprising means for removing one or more shapes from the second set of one or more shapes, responsive to determining that the one or more shapes contains no objects.

36. The system of claim 32, further comprising means for determining a second set of one or more upper bounds, an upper bound being associated with a shape in the second set of one or more shapes, an upper bound being a highest number of objects that can be contained in the associated shape.

37. The system of claim 36, wherein the means for determining the second set of one or more upper bounds comprises means for dividing the area of a shape by a minimum object size.

38. The system of claim 32, further comprising means for updating the data structure.

39. The system of claim 38, wherein the data structure comprises a tree data structure, a node of the tree data structure being associated with a shape in the first set of one or more shapes.

40. The system of claim 39, wherein a node of the free data structure comprises a lower bound of the associated shape.

41. The system of claim 39, wherein a node of the tree data structure comprises an upper bound of the associated shape.

42. The system of claim 39, wherein the means for updating the data structure comprises one element of a group containing:
means for adding a node to the data structure;
means for removing a node from the data structure; and
means for updating a node in the data structure.

* * * * *

UNITED STATES PATENT AND TRADEMARK OFFICE
CERTIFICATE OF CORRECTION

PATENT NO. : 6,987,885 B2  
DATED : January 17, 2006  
INVENTOR(S) : Hector H. Gonzalez-Banos et al.

It is certified that error appears in the above-identified patent and that said Letters Patent is hereby corrected as shown below:

Column 16,  
Line 37, delete "anode" and insert -- a node --.

Column 18,  
Line 21, delete "free" and insert -- tree --.

Signed and Sealed this

Fourth Day of April, 2006

JON W. DUDAS  
*Director of the United States Patent and Trademark Office*